No. 692,917. Patented Feb. 11, 1902.
W. W. SALMON.
ELECTRIC SIGNALING SYSTEM.
(Application filed Feb. 4, 1901.)
(No Model.)
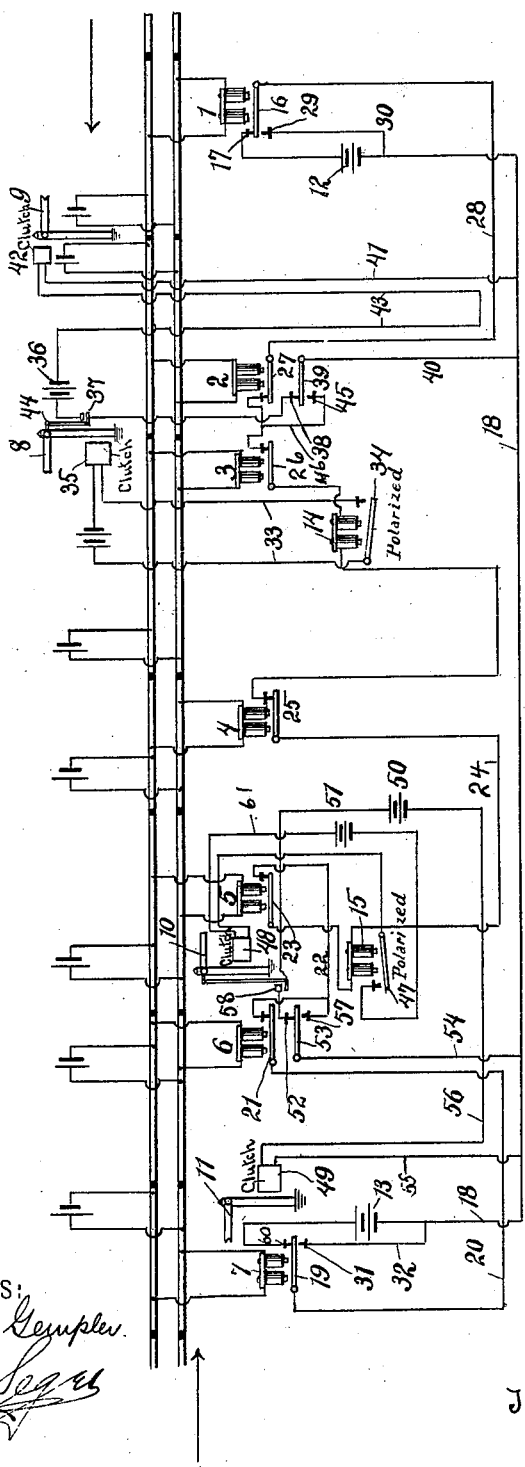
WITNESSES:
INVENTOR
BY
ATTORNEYS

UNITED STATES PATENT OFFICE.

WILMER W. SALMON, OF CHICAGO, ILLINOIS.

ELECTRIC SIGNALING SYSTEM.

SPECIFICATION forming part of Letters Patent No. 692,917, dated February 11, 1902.

Application filed February 4, 1901. Serial No. 45,833. (No model.)

*To all whom it may concern:*

Be it known that I, WILMER W. SALMON, a citizen of the United States, and a resident of Chicago, Cook county, and State of Illinois, have invented certain new and useful Improvements in Electric Signaling Systems, of which the following is a specification.

This invention relates to improvements in electric signaling systems, especially such as are designed and arranged for use in connection with a single-track railway. The system may extend over any number of blocks desired, in which signals on one side of the track guard the rear of trains running in one direction and the signals on the other side of the track guard the rear of trains running in the opposite direction.

In the present specification trains which run from right to left of the drawing will be designated, merely for the sake of a correct understanding of the system, as "inrunning" trains and the signals which guard the rear of such trains as "inrunning" signals. Trains running in the opposite direction, or from left to right, will be designated as "outrunning" trains, and the signals which guard the rear of such trains will be designated as "outrunning" signals.

The invention seeks to provide a reliable system of the character referred to and one in which the number of circuits and connections may be reduced and one in which the home and distant signals may be employed.

In the accompanying drawing, forming part of the specification, a system embodying the various features of the invention is shown in diagram.

In the system shown in the drawing home and distant signals are employed, the signals standing normally at "danger." It will be understood, however, that the distant signals may be omitted and also that the signals standing normally at "safety" may be employed without departing from the general scope of the invention.

Referring now to the particular system illustrated in the drawing, the track is divided into a convenient number of insulated track-subsections, the rails of each subsection being included in a rail-circuit. These several rail-circuits include, respectively, magnets 1 2 3 4 5 6, and 7, 8, and 9 are the inrunning home and distant signals, respectively.

10 and 11 are the home and distant outrunning signals, respectively. The signal-circuit contains two oppositely-arranged batteries 12 and 13 of substantially equal power and also two polarized magnets 14 and 15, having like poles arranged toward each other. These magnetic devices 14 and 15 control the operation of the signals, the magnet 14 controlling the operation of home signal 8 and through this signal the operation of distant signal 9 and the magnet 15 controlling the operation of home signal 10 and through this signal the operation of distant signal 11. The batteries 12 and 13 are normally in closed circuit with magnets 14 and 15; but by reason of the arrangement of the batteries as described polarity of the magnets 14 and 15 is normally not sufficient to operate their respective armatures. When, however, battery 12 is cut out of the signal-circuit, magnet 14 alone responds to the current from battery 13, and when battery 13 is cut out of the signal-circuit magnet 15 alone responds to battery 12. Battery 12 is arranged to be cut out of the signal-circuit by an inrunning train in advance of signals 8 and 9, so that such inrunning train before it reaches signals 8 and 9 causes the magnet 14 to be operated so as to put the signals 8 and 9 to "safety" in front of the inrunning train. When an outrunning train is in advance of the outrunning signals 10 and 11, it cuts out the battery 13, thereby causing magnet 15 to respond to battery 12 and causing signals 10 and 11 to go to "safety" in front of a train. When an inrunning and an outrunning train simultaneously approach signals 9 and 11, respectively, both batteries 12 and 13 are cut out and the home and distant inrunning signals and the home and distant outrunning signals all remain at "danger." This part of my invention contemplates the use in the signal-circuit of any form of magnets of any suitable character which are arranged to respond or become operative upon different electric conditions of a signal-circuit.

The signal-circuit may be traced as follows: circuit-controller 16, front contact 17, battery 12, circuit-wire 60, opposing battery 13, front contact 18, circuit-controller 19, circuit-wire 20, circuit-controller 21, wire 22, circuit-controller 23, polarized magnet 15, wire 24, circuit-controller 25, polarized magnet 14, circuit-controller 26, circuit-controller 27, wire 28, to circuit-controller 16. Circuit-controller 16 is provided with a back contact 29, connected by a wire 30 to wire 18 on that side of the battery 12 which is farthest from contact 17. Circuit-controller 19 is provided with a back contact 31, connected by wire 32 to wire 18 on that side of the battery 13 which is farthest from the contact 60. Polarized magnet 14 is made to control the operation of the signal 8 through the intermediation of a circuit 33, containing normally open circuit-controller 34 and a magnetic clutching device 35. The power for operating the signal 8 may be of any suitable character. The distant signal 9 is provided with a circuit which may be traced as follows: battery 36, circuit-controller 37, front contact 38, circuit-controller 39, wire 40, wire 18, wire 41, magnetic clutching device 42, wire 43, back to battery 36. The clutching device 42 and the motor for the distant signal 9 may be arranged in the same way as with respect to home signal 8. The home signal 8 is so connected, as by rod 44, with the circuit-controller 37 that circuit-controller 37 will be open when the signal 8 is at "danger" and closed when the signal is at "safety." Thus it will be noted that the circuit of the clutch 42 is normally open and that when signal 8 is put to "safety" clutch 42 is energized to cause the distant signal 9 to go to "safety" thereafter. Circuit-controller 27 is held in normally closed position and circuit-controller 39 is held normally closed against front contact 38 by track-magnet 2. Circuit-controller 39 is provided with a back contact 45, connected by wire 46 between the circuit-controllers 26 and 27, so that when the track-magnet 2 is deënergized to break the signal-circuit of battery 13 at circuit-controller 27 the battery 13 will nevertheless be kept on closed circuit through the polarized magnet 14, this circuit being completed from circuit-controller 26 through wire 46, back contact 45, circuit-controller 39, wire 40, wire 18, back to battery 13. Circuit-controllers 26 and 25 are operated, respectively, by track-magnets 3 and 4.

The polarized magnet 15 is made to control the operation of the home signal 10 through the intermediation of signal-circuit 60, which contains the normally open circuit-controller 47 and a magnetic clutching device 48. The motor for the signal 10 and the clutching device 48 may be operatively connected in the same way as has been described with respect to home signal 8. When the polarized magnet 15 is energized, the circuit 46 will be closed and the clutching device 48 energized, whereupon the signal 10 will be put to "safety," the signal returning to "danger" when magnet 15 is deënergized. The clutching device 49 and the motor for the signal 11 may be operatively connected with this signal 11 in precisely the same way as has been described with respect to signal 10. This clutching device 49 is in a circuit which may be traced as follows, starting from battery 50: battery 50, wire 51, contact 58, front contact 52, circuit-controller 53, wire 54, wire 18, wire 55, clutching device 49, wire 56, back to battery 50. Circuit-controller 53 is provided with a back contact 57, which is connected with the main signal-circuit at a point between the circuit-controllers 21 and 23. Track-magnet 6, which operates circuit-controller 21, also operates circuit-controller 53, circuit-controller 53 being held normally against its front contact 52 and when track-magnet 6 is deënergized closing with back contact 57. By this arrangement when the signal-circuit, including the battery 12 and polarized magnet 15, is broken at circuit-controller 21 the circuit in this battery is still kept closed through magnet 15, because the circuit-controller 53 will be closed with back contact 57 at this time, the current from the battery passing from magnet 15 through circuit-controller 23 to wire 22, back contact 57, circuit-controller 53, wire 54, wire 18, to battery. The circuit of the clutching device 49 contains a normally open circuit-controller 58, suitably connected for operation with the signal 10 in such a way that when the signal is at "danger" the circuit-controller will be open and when the signal is at "safety" the circuit-controller will be closed. By this arrangement when polarized magnet 15 is energized and the signal 10 put to "safety" the circuit of the clutching device 49 will be closed at circuit-controller 58, thereby causing signal 11 to follow the signal 10 to "safety."

The operation of the system is as follows: An inrunning train approaching distant signal 9 shunts track-magnet 1 and shifts circuit-controller 16 to back contact 29, thereby cutting battery 12 out of the signal-circuit. Battery 13 thereby energizes polarized magnet 14, which closes circuit 33 at circuit-controller 34, thereby causing signal 8 to go to "safety," which operation closes the circuit from battery 36 through clutching device 42, causing distant signal 9 to go to "safety." If an outrunning train should now after the operation just described approach distant signal 11 and shunt track-magnet 7, it would not be able to put the home signal 10 or distant signal 11 to "safety," because the inrunning train has already cut battery 12 out of the signal-circuit. Thus the inrunning train has not only put the inrunning home and distant signals to "safety," but it also holds to "danger" the outrunning signals 10 and 11. When the inrunning train passes signal 9, magnet 2 is deënergized and the circuit of clutching device 42 is broken at circuit-controller 39, so that signal 9 goes to "danger" behind the train. The shunting of magnet 2 causes circuit-controller 27 to break the signal-circuit through battery 12, which would otherwise be closed when the train ceased to shunt magnet 1. The signal-circuit from battery 13 through polarized magnet 14 is, however, still kept closed by the circuit-controller 39 contacting with back contact 45, so that signal 8, is still kept at "safety" in advance of the train. When the train has passed to signal 8, it shunts magnet 3, and so breaks the signal-circuit at 26, thereby continuing both the outrunning signals at "danger" and also deënergizing polarized magnet 14 and causing signal 8 to go to "danger" behind the train. When the train shunts magnet 4, the signal-circuit is again broken at circuit-controller 25, thereby continuing to hold both the inrunning signals and both the outrunning signals at "danger." When the train shunts the magnet 5, it breaks the signal-circuit controller at 23 and continues both the inrunning and both the outrunning signals at "danger." When the train shunts the track-magnet 6, it breaks the signal-circuit at circuit-controller 21, thereby continuing home and distant signals 8 and 9 at "danger." It also shifts the circuit-controller 53 from front contact 52 to back contact 57, thereby breaking the circuit through clutching device 49 and continuing distant signal 11 at "danger." It is true that the closing of circuit-controller 53 on contact 57 permits the battery 12 to energize polarized magnet 15 and put outrunning home signal 10 to "safety" behind the inrunning train; but this movement of signal 10 is of no consequence. When the train shunts track-magnet 7, battery 13 is cut out of the signal-circuit and the inrunning home and distant signals 8 and 9 are continued at "danger." The outrunning home and distant signals would at this time go to "safety;" but this would obviously be of no consequence.

While the invention is shown in the drawing in what is believed to be the best embodiment of the same, it will be understood, of course, that various changes in arrangement may be made without departing from the scope of the invention. It is to be observed, moreover, that for the sake of clearness all of the circuits and connections which would be employed in a practical installation between inrunning and outrunning signals have not been shown in the drawing. These circuits and connections would be employed to operate either inrunning home and distant signals in advance of the signals 8 and 9 or outrunning home and distant signals in advance of the signals 10 and 11. If such additional signals and their circuits were shown in the drawing, it would serve rather to complicate than to make clear the invention.

What I claim as new, and desire to secure by Letters Patent, is—

1. In a single-track electric signaling device the combination of inrunning and outrunning signals; a signal-circuit containing a source of electric energy and two polarized magnetic devices adapted to control the operation of the said signal, and means controlled by an inrunning train to permit the flow of a constant current for selecting one of said polarized magnets; and means controlled by an outrunning train to select the other polarized magnet.

2. In a single-track electric signaling system, the combination of inrunning and outrunning signals, a signal-circuit containing two polarized magnetic devices adapted to control the operation of said signals, opposing batteries, and means controlled by an inrunning train to permit the flow of the current from one of said batteries in the said signal-circuit.

3. In a single-track electric signaling system, the combination of inrunning and outrunning signals normally at danger; a signal-circuit containing two polarized magnetic devices in series which are adapted to control the operation of said signals; a generator in series with the said magnets; and means for selectively controlling the said magnetic devices.

4. In a single-track electric signaling system, the combination of inrunning and outrunning signals normally at danger; a signal-circuit containing two polarized magnetic devices adapted to control the operation of said signals; a generator in series with the said polarized magnets; means controlled by an inrunning train in the rear of the inrunning signal to operate the magnetic device of the inrunning signal and prevent the operation of the magnetic device of the outrunning signal; and means controlled by an outrunning train in the rear of the outrunning signal to operate the magnetic device of the outrunning signal and prevent the operation of the magnetic device of the inrunning signal; said means being so arranged that when they are simultaneously operated the magnetic devices cause said signals to be at danger.

5. In a single-track electric signaling system, the combination of inrunning and outrunning signals normally at danger; a signal-circuit containing two polarized magnetic devices adapted to control the operation of said signals, opposing sources of electric energy; means controlled by an inrunning train in the rear of the inrunning signal to operate the magnetic device of the inrunning signal; and means controlled by an outrunning train in the rear of the outrunning signal to operate the magnetic device of the outrunning signal, said means being so arranged that when they are simultaneously operated the magnetic devices cause said signals to remain at danger.

6. In a single-track electric signaling system, the combination of inrunning and outrunning signals normally at danger; a signal-circuit containing two polarized magnetic devices adapted to control the operation of said signals; opposing sources of electric energy; means controlled by an inrunning train in the rear of the inrunning signal for cutting out one of said sources to operate the magnetic device of the inrunning signal; and means controlled by an outrunning train in the rear of the outrunning signal for cutting out another of the said sources to operate the magnetic device of the outrunning signal, and means controlled by a train between said signals for holding both signals at danger.

7. In a single-track electric signaling system, the combination of inrunning and outrunning signals; a signal-circuit containing two opposing batteries and two polarized magnetic devices adapted to control the operation of said signals, said polarized magnetic devices being arranged with like poles toward each other; means controlled by an inrunning train to operate the magnetic device of the inrunning signal; and means controlled by an outrunning train to operate the magnetic device of the outrunning signal; said means being so arranged that when they are simultaneously operated the magnetic devices cause said signals to be at danger.

8. In a single-track electric signaling system, the combination of inrunning and outrunning signals normally at danger; a signal-circuit containing two opposing batteries and two polarized magnetic devices adapted to control the operation of said signal, said polarized magnetic devices being arranged with like poles toward each other; means controlled by an inrunning train to operate the magnetic device of the inrunning signal; and means controlled by an outrunning train to operate the magnetic device of the outrunning signal, said means being so arranged that when they are simultaneously operated the magnetic devices cause said signals to remain at danger.

9. In a single-track electric signaling system, the combination of inrunning and outrunning signals normally at danger; a signal-circuit containing two opposing batteries and two polarized magnetic devices adapted to control the operation of said signals, said polarized magnetic devices being arranged with like poles toward each other; means controlled by an inrunning train in the rear of the inrunning signal to operate the magnetic device of the inrunning signal and prevent the operation of the magnetic device of the outrunning signal; and means controlled by an outrunning train in the rear of the outrunning signal to operate the magnetic device of the outrunning signal and prevent the operation of the magnetic device of the inrunning signal, said means being so arranged that when they are simultaneously operated the magnetic devices cause said signals to be at danger.

10. In a single-track electric signaling system, the combination of inrunning and outrunning signals normally at danger; a signal-circuit containing two opposing batteries and two polarized magnetic devices adapted to control the operation of said signals; said polarized magnetic devices being arranged with like poles toward each other; means controlled by an inrunning train in the rear of the inrunning signal to operate the magnetic device of the inrunning signal and prevent the operation of the magnetic device of the outrunning signal; and means controlled by an outrunning train in the rear of the outrunning signal to operate the magnetic device of the outrunning signal and prevent the operation of the magnetic device of the inrunning signal, said means being so arranged that when they are simultaneously operated the magnetic devices cause said signals to remain at danger, and means controlled by a train between said signals for holding both signals at danger.

11. In a single-track electric signaling system, the combination of inrunning and outrunning home and distant signals, a distant signal being so arranged that its movement to safety is dependent upon the previous movement of its home signal to safety; a signal-circuit containing two magnetic devices adapted to control the operation of said home signals; said magnetic devices being operative upon different conditions of the signal-circuit; means controlled by an inrunning train to operate the magnetic device of the inrunning home signal; and means controlled by an outrunning train to operate the magnetic device of the outrunning home signal; said means being so arranged that when they are simultaneously operated the magnetic devices cause said home signals to be at danger.

12. In a single-track electric signaling system, the combination of inrunning and outrunning home and distant signals normally at danger, a distant signal being so arranged that its movement to safety is dependent upon the previous movement of its home signal to safety; a signal-circuit containing two magnetic devices adapted to control the operation of said home signals; said magnetic devices being operative upon different electrical conditions of the signal-circuit; means controlled by an inrunning train to operate the magnetic device of the inrunning home signal; and means controlled by an outrunning train to operate the magnetic device of the outrunning home signal; said means being so arranged that when they are simultaneously operated the magnetic devices cause said home signals to remain at danger.

13. In a single-track electric signaling system, the combination of inrunning and outrunning home and distant signals normally at danger; a signal-circuit containing two magnetic devices adapted to control the operation of said home signals; said magnetic devices being operative upon different electric conditions of the signal-circuit; means controlled by an inrunning train in the rear of the inrunning distant signal to operate the magnetic device of the inrunning home signals to put said inrunning signals to safety, and means controlled by an outrunning train to operate the magnetic device of the outrunning signals to put said signals to safety; said means being so arranged that when they are simultaneously operated the magnetic devices cause said inrunning and outrunning home and distant signals to remain at danger.

14. In a single-track electric signaling system, the combination of inrunning and outrunning home and distant signals normally at danger; a signal-circuit containing two magnetic devices adapted to control the operation of said signals; said magnetic devices being operative upon different electric conditions of the signal-circuit; means controlled by an inrunning train in the rear of the inrunning distant signal to hold the outrunning signals at danger and to operate the magnetic device of the inrunning signals to put said inrunning signals to safety; and means controlled by an outrunning train in the rear of the outrunning distant signal to hold the inrunning signals at danger and to operate the magnetic device of the outrunning signals and put said outrunning signals to safety; said means being so arranged that when they are simultaneously operated the magnetic devices cause said inrunning and outrunning home and distant signals to be at danger.

15. In a single-track electric signaling system, the combination of inrunning and outrunning home and distant signals normally at danger, a signal-circuit containing two magnetic devices adapted to control the operation of said signals; said magnetic devices being operative upon different conditions of the signal-circuit; means controlled by an inrunning train in the rear of the inrunning distant signal to hold the outrunning signals at danger and to operate the magnetic device of the inrunning home signal and thereby put both of said inrunning signals to safety; and means controlled by an outrunning train in the rear of the outrunning distant signal to hold the inrunning signals at danger and to operate the magnetic device of the outrunning home signal and thereby put both of said outrunning signals to safety; said means being so arranged that when they are simultaneously operated the magnetic devices cause said inrunning and outrunning home and distant signals to remain at danger.

16. In a single-track electric signaling system, the combination of inrunning and outrunning home and distant signals normally at danger; a signal-circuit containing two polarized magnetic devices adapted to control the operation of said signals; said polarized magnetic devices being arranged with like poles toward each other; means controlled by an inrunning train in the rear of the inrunning distant signal to operate the magnetic device of the inrunning signals to put said signals to safety; and means controlled by an outrunning train in the rear of the outrunning distant signal to operate the magnetic device of the outrunning signals to put said signals to safety; said means being so arranged that when they are simultaneously operated the magnetic devices cause said inrunning and outrunning home and distant signals to remain at danger.

17. In a single-track electric signaling system, the combination of inrunning and outrunning home and distant signals normally at danger, a distant signal being so arranged that its movement to safety is dependent upon the previous movement of its home signal to safety; a signal-circuit containing two polarized magnetic devices adapted to control the operation of said home signals, said polarized magnetic devices being arranged with like poles toward each other; means controlled by an inrunning train in the rear of the inrunning distant signal to hold the outrunning signals at danger and to operate the magnetic device of the inrunning signals and put said inrunning signals to safety; and means controlled by an outrunning train in the rear of the outrunning distant signal to hold the inrunning signals at danger and to operate the magnetic device of the inrunning signals to put said inrunning signals to safety; said means being so arranged that when they are simultaneously operated the magnetic devices cause said inrunning and outrunning home and distant signals to remain at danger.

18. In a single-track electric signaling system, the combination of inrunning and outrunning home and distant signals, a signal-circuit containing two opposing batteries and two polarized magnetic devices adapted to control the operation of said signals, said polarized magnetic devices being arranged with like poles toward each other; means controlled by an inrunning train to operate the magnetic device of the inrunning signals; and means controlled by an outrunning train to operate the magnetic device of the outrunning signals; said means being so arranged that when they are simultaneously operated the magnetic devices cause said signals to be at danger.

19. In a single-track electric signaling system, the combination of inrunning and outrunning home and distant signals normally at danger, a signal-circuit containing two opposing batteries and two polarized magnetic devices adapted to control the operation of said home signals, said polarized magnetic devices being arranged with like poles toward each other; means controlled by an inrunning train in the rear of the inrunning distant signal to hold the outrunning signals at danger and to operate the magnetic device of the inrunning signals to put said inrunning signals to safety; and means controlled by an outrunning train in the rear of the outrunning distant signal to hold the inrunning signals to danger and to operate the magnetic device of the outrunning signals to put said signals to safety, said means being so arranged that when they are simultaneously operated the magnetic devices cause said inrunning and outrunning home and distant signals to remain at danger.

20. In a single-track electric signaling system, the combination of inrunning and outrunning home and distant signals normally at danger, a distant signal being so arranged that its movement to safety is dependent upon the previous movement of its home signal to safety; a signal-circuit containing two opposing batteries and two polarized magnetic devices adapted to control the operation of said home signals, said polarized magnetic devices being arranged with like poles toward each other; means controlled by an inrunning train in the rear of the inrunning distant signal to hold said outrunning signals at danger and to operate the magnetic device of the inrunning signals to put said inrunning signals to safety, and means controlled by an outrunning train in the rear of the outrunning distant signal to hold the inrunning signals at danger and to operate the magnetic device of the outrunning signals to put the outrunning signals to safety; said means being so arranged that when they are simultaneously operated the magnetic devices cause said outrunning and inrunning home and distant signals to remain at danger.

21. In a single-track electric signaling system, the combination of inrunning and outrunning home and distant signals normally at danger; signal-circuits for the distant signals, each such circuit being controlled by the movement of its corresponding home signal; a normally closed signal-circuit containing two opposing batteries and two polarized magnetic devices arranged with like poles toward each other, and each controlling a home signal, whereby said batteries normally neutralize each other and said polarized magnetic devices are normally deënergized; track-circuits in the rear of the inrunning and outrunning distant signals, each adapted to cut in and out of circuit one of said batteries, whereby an inrunning train in the rear of the inrunning distant signal may cut out one battery and thereby hold the outrunning signals at danger and put the home and distant inrunning signals to safety, and whereby an outrunning train in the rear of the outrunning distant signal may cut out one battery and thereby hold the inrunning signals at danger and put the inrunning home and distant signals to safety; and track-circuits between the inrunning and outrunning signals in operative connection with the several signal-circuits, the arrangement being such that when an inrunning train is between the inrunning home and distant signals said distant signal goes to danger and said home signal remains at safety; when the train is between the inrunning home signal and the outrunning distant signal the inrunning home and distant signals are held at danger, and from the time the inrunning train puts the inrunning signals to safety until the train has passed the outrunning distant signal the outrunning signals are both held at danger.

In testimony whereof I have signed my name to this specification in the presence of two subscribing witnesses.

WILMER W. SALMON.

Witnesses:
L. THOMAS,
P. R. CHAPMAN.